United States Patent
Villaume et al.

(10) Patent No.: US 7,139,645 B2
(45) Date of Patent: Nov. 21, 2006

(54) PROCESS AND DEVICE FOR AIDING THE DRIVING OF A VEHICLE RUNNING OVER THE GROUND

(75) Inventors: Fabrice Villaume, Toulouse (FR); Eric Godard, Toulouse (FR); David Chabe, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/615,397

(22) Filed: Jul. 9, 2003

(65) Prior Publication Data

US 2004/0054449 A1    Mar. 18, 2004

(30) Foreign Application Priority Data

Jul. 10, 2002   (FR)   ................................ 02 08672

(51) Int. Cl.
*G06F 19/00*   (2006.01)
(52) U.S. Cl. .......................................... 701/16
(58) Field of Classification Search ............ 701/1, 701/3, 7–9, 14, 16, 70, 93, 96, 110, 117, 120; 340/425.5, 441, 461, 464, 466–467
See application file for complete search history.

(56) References Cited

U.S. PATENT DOCUMENTS

| | | | |
|---|---|---|---|
| 4,638,437 A * | 1/1987 | Cleary et al. ................. | 701/5 |
| 5,103,224 A | 4/1992 | Arad | |
| 5,142,478 A | 8/1992 | Crook | |
| 5,353,022 A | 10/1994 | Middleton et al. | |
| 5,499,025 A * | 3/1996 | Middleton et al. .......... | 340/959 |
| 5,668,541 A * | 9/1997 | Coquin et al. .............. | 340/959 |
| 5,968,106 A * | 10/1999 | DeVlieg et al. ............. | 701/70 |
| 6,067,497 A * | 5/2000 | Sekine et al. ............... | 701/93 |
| 6,133,857 A | 10/2000 | Millard et al. | |
| 6,254,202 B1 * | 7/2001 | Kawamoto ............. | 303/122.09 |
| 2005/0057701 A1 * | 3/2005 | Weiss ........................ | 349/10 |

FOREIGN PATENT DOCUMENTS

| | | | |
|---|---|---|---|
| DE | 33 28 226 | * | 2/1985 |
| GB | 2224475 | | 5/1990 |

OTHER PUBLICATIONS

U.S. Appl. No. 60/357,290, of Weiss.*

* cited by examiner

*Primary Examiner*—Thu V. Nguyen
(74) *Attorney, Agent, or Firm*—Stevens, Davis, Miller & Mosher, LLP

(57) ABSTRACT

A device and process for aiding the driving of an aircraft running over the ground in an acceleration phase with a view to takeoff may include determining a current speed v0 of the aircraft and a value acc corresponding to a deceleration of the aircraft during emergency braking. A distance df to be traveled on the ground by the aircraft while stopping is calculated using the expression $df=(v0)^2/2\ acc$, and a stopping position of the aircraft is calculated from the distance df and a current position of the aircraft. Thereafter, the distance df and the stopping position are presented to a driver of the aircraft with the aid of an appropriate device.

8 Claims, 1 Drawing Sheet

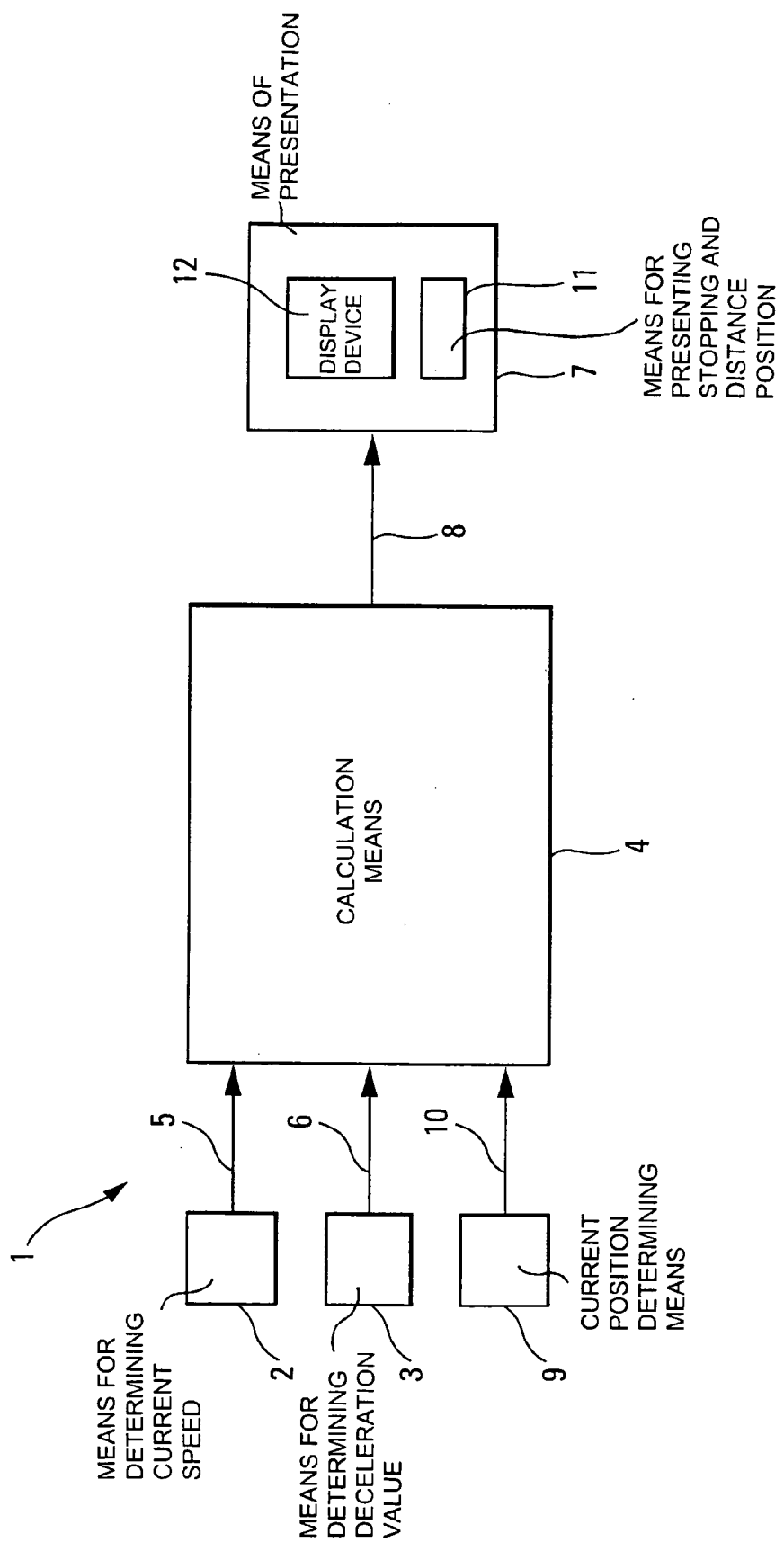

PROCESS AND DEVICE FOR AIDING THE DRIVING OF A VEHICLE RUNNING OVER THE GROUND

FIELD OF THE INVENTION

The present invention relates to a process and a device for aiding the driving of a vehicle running over the ground.

BACKGROUND OF THE RELATED ART

Although not exclusively, the present invention applies more particularly to an aircraft, in particular a transport airplane, that can run over the ground, in particular during acceleration and deceleration phases, with a view respectively to the takeoff and landing of said aircraft.

It is known that, during the phases of braking (deceleration) of a vehicle moving on the ground, for example an aircraft running over a runway during landing, it is frequently the case that the driver or pilot of this vehicle initially applies the maximum braking intensity permitted by the characteristics of the vehicle. When the latter reaches a speed much lower than its original speed corresponding to a stopping distance of a few meters, the pilot ceases this braking and maintains this speed until the desired stopping position is reached. This method of driving or of piloting guarantees to the pilot that the vehicle does not overshoot said desired stopping position.

However, this method has several drawbacks. Firstly, it results in increased invoking of the brakes, thereby causing them to wear prematurely. Secondly, having a phase of running at reduced speed often causes a prolonging of the time required to reach the desired stopping position.

The document GB-2 224 475 discloses a device making it possible to display a plurality of stopping distances of a vehicle on the windscreen of the latter. These stopping distances correspond to theoretical values for several predetermined speeds (the ones used most). This device therefore has a preventive role, but it does not make it possible to aid the driver during abrupt braking from a particular running speed.

Furthermore, the document U.S. Pat. No. 4,638,437 discloses a device making it possible to display in particular the stopping distance of an aircraft, representative of maximum braking. For the calculation of the stopping distance, this device takes account of parameters relating to the environmental conditions (state of the runway, weather, etc). This known device does not make it possible to aid the driver in the aforesaid braking situation. Moreover, the taking into account of environmental conditions makes it necessary to proceed to the acquisition of parameters related to the ground infrastructures, this having the drawback of rendering this known device dependent on said ground infrastructures.

SUMMARY OF THE INVENTION

The object of the present invention is to remedy these drawbacks. It relates to a process for aiding the driving of a vehicle running over the ground, in particular during a braking phase.

For this purpose, according to the invention, said process is noteworthy in that the following successive operations are carried out repetitively:

a) at least the current speed v0 of the vehicle and a value acc corresponding to a deceleration of said vehicle are determined;

b) with the aid of these values v0 and acc, the distance df to be traveled on the ground by the vehicle in order to reach a particular speed vf is calculated using the following expression:

$$df = \frac{vO^2 - vf^2}{2acc}$$

c) this distance df is presented to a driver of the vehicle with the aid of an appropriate means.

Thus, by virtue of the invention, an estimate of the distance df remaining to be traveled in order to go from the current speed v0 to said particular speed vf is presented to the pilot of the vehicle.

Preferably, said particular speed vf is zero and corresponds to the stopping of the vehicle so that the distance presented is then the stopping distance, that is to say the distance required to stop the vehicle.

Moreover, advantageously, for a vehicle in the deceleration phase, said value acc is the current deceleration of the vehicle. Thus, by virtue of the invention, the pilot of the vehicle knows an estimate of the stopping distance such as it exists if he maintains the current conditions of deceleration. This process is very advantageous since it uses for its implementation only parameters related to the vehicle, thereby rendering it independent of any device for acquiring parameters related to the environment (state of the ground, weather, etc.) and of any numerical model of the behavior of the vehicle. Moreover, the accuracy of this estimated stopping distance increases as the vehicle approaches its stopping position. Specifically, the speed decreasing, the effect on braking of the parameters related to the environment decreases, thereby increasing the accuracy of the stopping distance estimated at the current instant.

Advantageously, for operation b), the stopping position of the vehicle is moreover calculated from said distance df and from the current position of said vehicle, and, for operation c), this stopping position is moreover presented to the operator.

Additionally, advantageously, for a vehicle in the acceleration phase, said value acc is a predetermined deceleration value. Preferably, said predetermined deceleration value corresponds to the deceleration undergone by the vehicle during emergency braking.

Thus, the pilot is continuously informed, during an acceleration phase, of the distance required to stop the vehicle. This mode of operation can be particularly useful in the case of an airplane: specifically it allows the pilot to ascertain, during acceleration with a view to takeoff, up to what moment he can interrupt this takeoff phase and apply emergency braking without any risk of overshooting the end of the runway.

The present invention also relates to a device for the implementation of the aforesaid process.

According to the invention, said device is noteworthy in that it comprises:

a first means for determining the current speed v0 of the vehicle;

a second means for determining said value acc;

a calculation means for calculating said distance df; and a means of presentation for presenting at least this distance df to a driver of the vehicle.

Moreover, advantageously, said device also comprises a means for determining the current position of the vehicle.

Furthermore, advantageously:

said first means is an inertial platform of said vehicle; and/or said second means is an inertial platform of said vehicle; and/or said means of presentation comprises a display of "head-up" type ("HUD") which is arranged in proximity to the windscreen of the vehicle. Preferably, said display is formed so as to display a symbol which corresponds, in the field of vision of a pilot, to the stopping position of the vehicle.

BRIEF DESCRIPTION OF THE DRAWING

The single FIGURE of the appended drawing will elucidate the manner in which the invention may be embodied. This FIGURE is the schematic diagram of a device in accordance with the invention.

DETAILED DESCRIPTION OF THE INVENTION

The device 1 in accordance with the invention and represented in the figure is intended to aid the pilot of a vehicle that can run over the ground, in particular of an aircraft such as a transport airplane for example, that can run over an airport runway, in such a way that said pilot can accurately evaluate the actual situation of said vehicle, as specified hereinbelow.

According to the invention, said device 1 comprises:

a means 2 for determining the current (actual) running speed v0 of the vehicle;

a means 3 for determining a value acc corresponding to a deceleration of said aircraft and specified hereinbelow;

a standard calculation means 4 which is connected by links 5 and 6 respectively to said means 2 and 3 and which is intended to automatically calculate a distance df which must be traveled by the vehicle in order to reach a particular speed vf specified hereinbelow; and a means of presentation 7 which is connected by a link 8 to said calculation means 4 and which is intended to automatically present at least said distance df to the pilot of the vehicle.

According to the invention, said calculation means 4 calculates the distance df from the following simplified relation or expression:

$$df = \frac{v0^2 - vf^2}{2acc} \quad (1)$$

In a preferred embodiment, said particular speed vf is zero and corresponds to the stopping of the vehicle so that the distance df then satisfies the following relation:

$$df = \frac{v0^2}{2acc} \quad (2)$$

This distance df of relation (2) represents the stopping distance, that is to say the distance required by the vehicle to stop from its current speed v0, taking into account the deceleration value acc.

In a preferred embodiment, applied to a vehicle in a deceleration phase, in particular due to braking, said deceleration value acc represents the current (actual) deceleration a0 of the vehicle. In this case, the device 1 in accordance with the invention presents the pilot with the stopping distance which exists if the pilot maintains the current conditions of deceleration (and therefore in particular of braking).

The device 1 is very advantageous, since for its implementation it uses only parameters related to the vehicle (v0, a0), thereby rendering it independent of any device for acquiring parameters related to the environment (state of the ground, etc.) and of any numerical model of the behavior of the vehicle. Moreover, the accuracy of the estimated stopping distance increases as the vehicle approaches its stopping position. Specifically, the speed decreasing, the effect on braking of the parameters related to the environment decreases, thereby increasing the accuracy of the stopping distance estimated at the current instant.

In a particular embodiment, the calculation means 4 calculates, moreover, the stopping position xf, from the distance df calculated previously and from the vehicle's current position x0 which is received from a means 9 by way of a link 10. For this purpose, said calculation means 4 uses, preferably, the following relation:

$$xf = x0 + df \quad (3)$$

Moreover, preferably, said means 9 is a geographical positioning device, in particular a differential "GPS" device. Furthermore, said means 2 and 3 can correspond to an inertial platform of the vehicle, in particular in the case of a transport airplane.

Additionally, the means of presentation 7 can comprise any type of means 11 (audible, tactile, etc.) making it possible to present the pilot with the stopping distance df and as appropriate the stopping position xf. In a preferred embodiment, said means of presentation 7 comprises a display device 12 of the "head-up display" type which makes it possible, for example, to present the information on the windscreen of the vehicle. Moreover, according to the invention, said display 12 is formed so as to display a symbol which corresponds, in the field of vision of a pilot, to said stopping position of the vehicle on the running track (runway, freeway, etc.).

As indicated previously, the device 1 in accordance with the invention is particularly advantageous in the deceleration phase, in particular in the vehicle braking phase, since it makes it possible to indicate the stopping distance by maintaining the current conditions of deceleration. Said device 1 is however also advantageous in the vehicle acceleration phase.

Specifically, in the acceleration phase (with a view to takeoff for an airplane, for example), the calculation means 4 can determine from the aforesaid relations (1), (2) and (3) the distance df and as appropriate the stopping position xf by using the current speed v0 and, for the value acc, a predetermined deceleration value a1. This predetermined deceleration value a1 can in particular be chosen in such a way as to correspond to the deceleration that the vehicle would undergo if the pilot decided on emergency braking. In this case, the pilot is continuously informed of the distance required for the vehicle to stop. This mode of operation can be particularly useful in the case of an airplane: specifically it allows the pilot to ascertain up to what moment he can interrupt a takeoff without any risk of overshooting the end of the runway during subsequent braking.

The invention claimed is:

1. A process for aiding the driving of an aircraft running over a runway in an acceleration phase with a view to takeoff, which allows the pilot to ascertain up to what moment the takeoff can be interrupted without risk of overshooting the end of the runway, wherein the following successive operations are carried out repetitively:

a) determining a current speed v0 of the aircraft and a value acc corresponding to a deceleration of said aircraft, wherein said value acc is a predetermined deceleration value which corresponds to the deceleration undergone by the aircraft during emergency braking;

b) with the aid of the values v0 and acc, calculating a distance df to be traveled on the ground by the aircraft in order to stop, using the following expression:

$$df=(v0)^2/2acc$$

and calculating a stopping position of the aircraft from said distance df and a current position of said aircraft; and c) presenting the distance df and the stopping position to a driver of the aircraft with the aid of a heads-up display, wherein:

the heads-up display displays a symbol on the windscreen of the aircraft such that the symbol is visually projected at the calculated stopping position of the aircraft in the pilot's view of the runway and of its end for use by the pilot to determine up to what moment the takeoff may be interrupted without risk of overshooting the runway.

2. A device for aiding the driving of an aircraft running over a runway in an acceleration phase with a view to takeoff, which allows the pilot to ascertain up to what moment the takeoff may be interrupted without risk of overshooting the end of the runway, the device comprising:

a first means for determining a current speed v0 of the aircraft;

a second means for determining a value acc corresponding to a deceleration of said aircraft;

a calculation means for calculating, with the aid of the values v0 and acc, a distance df to be traveled on the ground by the aircraft in order to stop by using the following expression:

$$df=(v0)^2/2acc$$

and for calculating moreover a stopping position from the distance df and from a current position of the aircraft; and a means of presentation for presenting the distance df and the stopping position to a driver of the aircraft, wherein said means of presentation comprises a head-up display which is arranged in proximity to a windscreen of the aircraft and which is formed so as to display a symbol such that the symbol is visually projected at the calculated stopping position of the aircraft in the pilot's view of the runway and of its end for use by the pilot to determine up to what moment the takeoff may be interrupted without risk of overshooting the runway.

3. The device of claim 2 wherein said first means is an inertial platform of the vehicle.

4. The device of claim 2 wherein said second means is an inertial platform of the vehicle.

5. The device of claim 2 further comprising a means for determining the current position of the vehicle.

6. An aircraft comprising a device according to claim 2 for aiding a pilot of the aircraft during the running of said aircraft over the ground.

7. A device for aiding the driving of an aircraft running over a runway in an acceleration phase with a view to takeoff, which allows the pilot to ascertain up to what moment the takeoff may be interrupted without risk of overshooting the end of the runway, the device comprising:

a first determination section that determines a current speed v0 of the aircraft;

a second determination section that determines a value acc corresponding to a deceleration of said aircraft;

a calculation section that calculates, with the aid of the values v0 and acc, a distance df to be traveled on the ground by the aircraft in order to stop by using the following expression:

$$df=(v0)^2/2acc$$

and that calculates moreover a stopping position from the distance df and from a current position of the aircraft; and a presentation section that presents the distance df and the stopping position to a driver of the aircraft, wherein:

said presentation section comprises a head-up display which is arranged in proximity to a windscreen of the aircraft and which is formed so as to display a symbol such that the symbol is visually projected at the calculated stopping position of the aircraft in the pilot's view of the runway and of its end for use by the pilot to determine up to what moment the takeoff may be interrupted without risk of overshooting the runway.

8. An aircraft comprising a device according to claim 7 for aiding a pilot of the aircraft during the running of said aircraft over the ground.

\* \* \* \* \*